United States Patent [19]
Bamburg et al.

[11] 4,056,913
[45] Nov. 8, 1977

[54] METHOD OF PACKAGING AND SHIPPING BULK MATERIAL USING REUSABLE OUTER SHELL

[75] Inventors: Robert A. Bamburg; Farris N. Duncan, both of West Monroe; Roger M. Floyd, Monroe, all of La.

[73] Assignee: Olinkraft, Inc., West Monroe, La.

[21] Appl. No.: 736,987

[22] Filed: Oct. 29, 1976

Related U.S. Application Data

[62] Division of Ser. No. 557,420, March 11, 1975, Pat. No. 4,040,558.

[51] Int. Cl.² .................................................. B65B 1/00
[52] U.S. Cl. .......................................... 53/27; 53/29; 53/37
[58] Field of Search ................... 53/3, 27, 29, 35, 36, 53/37, 170, 173

[56] References Cited
U.S. PATENT DOCUMENTS

2,730,287  1/1956  Mueller ............................... 53/29 X
3,967,772  7/1976  Baker .................................. 53/29 X Primary Examiner—Robert Louis Spruill
Attorney, Agent, or Firm—O'Brien & Marks

[57] ABSTRACT

An improved combination shipping and storage container which comprises an inner container having at least one product receiving cell which is positioned within a removable outer shell which has an open top and an open bottom. The outer shell is removable from the inner container by means of a plurality of notches formed in opposite sides of the upper portion of the inner container which permits the outer shell to be lifted upwardly and removed from the inner container so that the outer shell can be reshipped to the original user and reused with a new inner container. After the outer shell is removed from the inner container, the inner container structure may be used to contain the products for storage purposes at a warehouse location. Also disclosed is a new and novel method for packaging a product utilizing the new and novel container here and before described.

6 Claims, 18 Drawing Figures

METHOD OF PACKAGING AND SHIPPING BULK MATERIAL USING REUSABLE OUTER SHELL

CROSS REFERENCE TO RELATED APPLICATION

This is a Divisional Application of parent application Ser. No. 557,420 filed Mar. 11, 1975, now U.S. Pat. No. 4,040,558.

BACKGROUND OF THE INVENTION

This invention relates generally to a combination shipping and storage container and more particularly to a new and novel container which is designed to handle heavy weights up to and over 2500 pounds with portions of the container being reusable.

In the shipment of large quantities and heavy amounts of bulk products, such as polyethylene pellets, it is necessary that the bulk container be designed to be able to be easily moved with materials handling equipment and to be stacked two or more high in a warehouse storage space without damage to the container and without bulge distortion or collapsing of the container. In order to construct a sufficiently strong container designed to contain all of the structural strengths required and to contain the product, it is necessary to resort to very expensive corrugated packages consisting of multi-layer or multi-wall thicknesses as known in the prior art. Such packages are, of course, expensive and once they have been set up or erected in a shipping condition, generally cannot be reused thereby resulting in excessive expenses to the purchaser of the package.

Pertinent prior art containers which should be considered by the Examiner in the examination of this application are cited below as follows:

| Patent No. | Inventor | Issue Date |
|---|---|---|
| 2,354,239 | Williamson | July 25, 1944 |
| 2,722,363 | Schaller | November 1, 1955 |
| 2,916,992 | Welsh | December 15, 1959 |
| 3,583,626 | Overton et al | June 8, 1971 |
| 3,606,969 | Voytko | September 21, 1971 |
| 2,681,526 | Barney | June 22, 1954 |
| 3,715,072 | Muskopf et al | February 6, 1973 |

These patents will be discussed briefly and distinguished in the following section after a short discussion of the applicant's invention.

SUMMARY OF THE INVENTION

The applicant's invention comprises a combination shipping and storage container which is formed with an inner container having at least one product receiving cell which is positioned within a removable outer shell that has an open top and an open bottom. The inner means for removing the outer shell from the inner container by lifting the outer shell upwardly. The removing means comprise in part, in the preferred embodiment, a plurality of notches being formed in opposite sides of the upper portion of the inner container. By the use of the notches in the inner container, the outer shell may be quickly removed with an appropriate lifting device to allow the outer shell to be reshipped to its original location and reused by the original purchaser of the combination container for shipment of more products in another product receiving inner container. In the preferred embodiment two double wall rectangular-shaped tubes are laminated together with a single wall flat rectangular-shaped tube laminated on the inside to provide the removable outer shell. The interior portion of the container may provide one, two, three or more interior cells for the product with the cells being separate units which may be glued or fastened or hinged together and may be manufactured of a relatively light weight material whose only requirement is that it be able to contain the product after removal of the exterior outer shell.

By providing a two-piece structure, an inner container having a cell or cells and a removable outer shell, the exterior outer shell provides the necessary resistance to bulge, damage and stacking strength and represents the major portion of the cost of the container to the user. As a result the expensive outer shell need only be purchased by the user once and can be continuously reused, after being reshipped to the purchaser, with the lighter weight and less expensive throw-away inner container. In a modification of the preferred embodiment, a bottom cap and/or a top cap are applied to the container and is locked thereupon by new and novel means to thereby provide a modified container.

This new and novel concept, has been heretofore unknown in the prior art and reference should now be made to the beforedescribed prior art patents so that the distinguishing characteristics of the applicant's container can be briefly discussed.

The patents to Williamson (U.S. Pat. No. 2,354,239); Schaller (U.S. Pat. No. 2,722,363); and Welsh (U.S. Pat. No. 2,916,992) teach well-known telescoping type containers which are used for various purposes in which the outer container is not designed for removal from the container and reuse as is taught by the applicant's disclosure. The patent to Barney (U.S. Pat. No. 2,681,526) is simply an outer decorative jacket which is positioned around an inner container and is designed to be permanently retained on the inner container by the beads of the inner container which retain the jacket against an accidental slip off from the inner container.

The Overton et al. patent (U.S. Pat. No. 3,583,626) teaches a reinforced outer container that is designed to contain an outer container with no provision being made for removal of the outer container upwardly while allowing the inner container to remain in place for product storage. This same concept is shown in the Voytko (U.S. Pat. No. 3,606,969) which utilizes an inner container which must be lifted from an outer reinforcing container and then used to dispense contents of the container from the bottom of the container. Because of the weight of the contents in the applicant's container (up to and over 2500 pounds), it is not felt to be practical and economically possible to design an inner container which can carry such high weights and which may be lifted out of the outer surrounding container without destroying the container.

The final reference patent to Muskopf et al. (U.S. Pat. No. 3,715,072) teaches simply a cellular container having an outer liner which is not designed to be easily removable from the inner cells as is taught in the applicant's disclosure and also is designed so that the cells of the container have reinforcing pads designed for bulge resistance and for stacking purposes as opposed to the applicant's disclosure which designs these features into the removable outer shell of the container.

Accordingly an object of the invention is to provide a new and novel combination shipping and storage container which comprises an inner container having at least one product receiving cell positioned within a removable and reusable outer shell which has an open top and bottom which may be easily removable from the inner container by means of novel removing means formed on the opposite sides of the upper portion of the inner container.

Another object of the invention is to provide a new and novel combination shipping storage container which comprises an inner container having at least one product receiving cell which is positioned within a removable outer shell with the outer shell comprising a plurality of liners in juxtaposition with each other and which contains flap means for retaining the liners in juxtaposition.

Yet another object of the invention is to provide a removable and reusable outer shell for use with a combination shipping and storage container which comprises an inner liner, an intermediate liner positioned around the inner liner and an outer liner positioned around the intermediate liner with a plurality of top flaps and bottom flaps being formed on the inner liner which are laminated to the outer liner to retain the intermediate and outer liners in position and for forming the returnable and reusable outer shell.

Still yet another object of the invention is to provide a new and novel method for packaging a product in a container utilizing the new and novel container herein described where the outer shell of the container may be reused after being removed upwardly from the inner container.

A further object of the invention is to provide a new and novel shipping container which is designed to handle extremely heavy weights of bulk material and which comprises an inner container which is designed, when standing alone, to contain the product and which has an outer shell which is removable from the inner container and which outer shell is designed to carry the stacking loads and to prevent bulge resistance in the container structure.

These and other objects and advantages of the invention will become apparent from a review of the drawings showing the invention and from a description of the preferred embodiment.

DESCRIPTION OF THE PREFERRED EMBODIMENT

Figure 1:
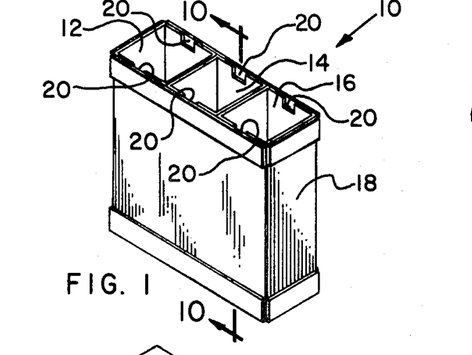
FIG. 1 is a perspective view of the subject combination shipping and storage container shown without top and bottom caps.

Referring now to FIG. 1 of the drawing there is shown the subject combination shipping and storage container generally by the numeral 10 which comprises an inner container 11 having a plurality of product receiving inner cells 12, 14, and 16 which are positioned within a removable and reusable outer shell 18. The combination shipping and storage container may have one cell or may have more than one cell with the preferred embodiment shown in FIG. 1 showing three cells in the inner container 11. The individual cells 12, 14 and 16 may be loosely positioned within the outer shell 18 or may be rigidly fastened together by means of staples, glue or some other suitable fastening device.

The outer shell 18 is not laminated or fastened to the cells 12, 14 and 16 and is designed to be easily removable by lifting the shell 18 upwardly by the use of removing means formed in the inner container 11. The removing means comprises in part in the preferred embodiment a plurality of notches 20 which are formed in the opposite sides of the upper portion of the cells 12, 14 and 16 as will be more fully described hereinafter. When constructed thusly, the outer shell 18 may be constructed of much heavier paper-board material than the cells 12, 14 and 16 and is designed to carry the weights of several combination containers which may be stacked on top of the container and is also designed to aid in preventing bulging from the contents of the cells by engaging the outer walls of the inner container 11 whenever the combination container 10 is shipped. Static sliding friction holding forces between the inside surfaces of the walls of the outer shell 18 and the outside surfaces of the walls of the inner container 11 due to any such engagement must be less than the combined weight of the inner container 11 and its contents to permit the outer shell 18 to be removed from the inner container 11 by lifting the outer shell 18 upward. At its ultimate destination, the outer shell 18 may then be removed from the cells 12, 14 and 16 and may then be reshipped back to the ultimate purchaser for reuse with another plurality of cells.

Figure 2:
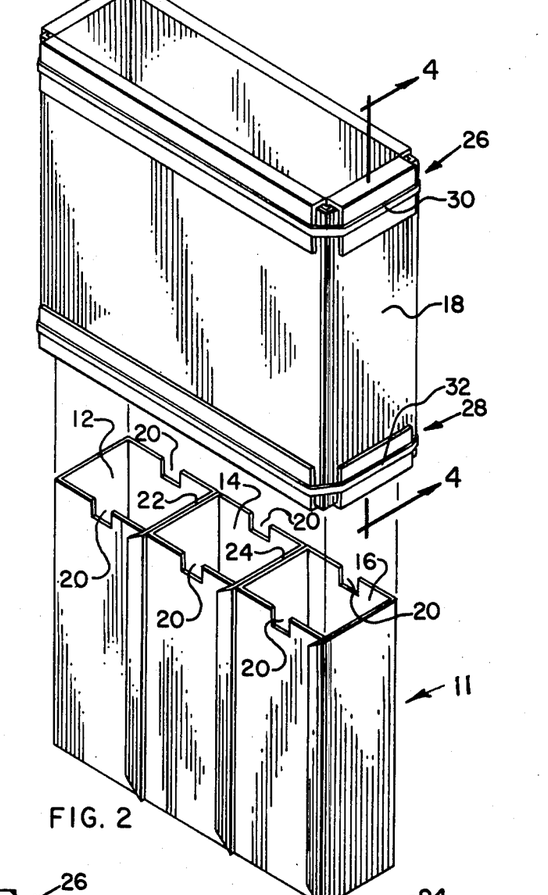
FIG. 2 is an exploded perspective view of the subject combination shipping and storage container showing the removable outer shell exploded from the inner container.

Referring now to FIG. 2 of the drawing there is shown an exploded perspective view of the subject combination shipping and storage container showing the outer shell 18 removed from the inner container 11 having the plurality of product receiving cells 12, 14 and 16. As beforementioned, the cell 12 may be laminated or stapled to the cell 14 as shown by the line 22 representing glue or some other fastening means while the cell 14 may be laminated to the cell 16 as shown by the line 24 representing glue or some other fastening means.

The outer shell 18 may be formed from a plurality of liners, as will be described more fully hereinafter, and may contain a plurality of top flaps, shown generally by the numeral 26 and a plurality of bottom flaps, shown generally by the numeral 28, which may be retained in place by glue and in addition may be retained in place by a pair of straps 30 and 32 to add rigidity to the returnable shell.

Figure 3:
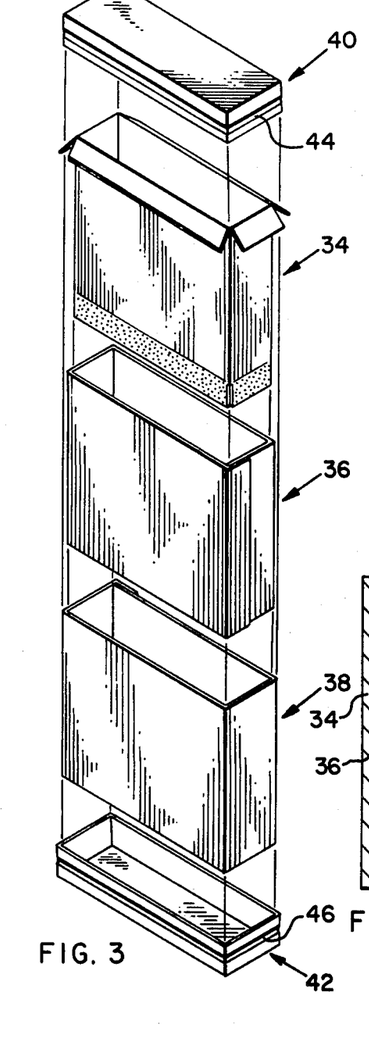
FIG. 3 is an exploded perspective view of the removable outer shell of the subject invention showing top and bottom caps which may also be positioned on the outer shell.

Referring now generally to FIG. 3 of the drawing there is shown an exploded perspective view of the outer shell 18 which comprises an inner liner, shown generally by the numeral 34, an intermediate liner, shown generally by the numeral 36, and an outer liner, shown generally by the numeral 38. When the outer shell is formed thusly, it may have positioned on the top and bottom thereof, after the cells 12, 14 and 16 have been placed within the shell, a top cap, shown generally by the numeral 40 and a bottom cap, shown generally by the numeral 42. The top and bottom caps 40 and 42 are detailed more fully in FIG. 9 of the drawing and will be discussed hereinafter and may also have positioned around the periphery thereof a strap 44 and 46 thereby adding further rigidity to the entire package. The straps also help to lock the top and bottom caps to the outer shell.

Figures 4, 5:
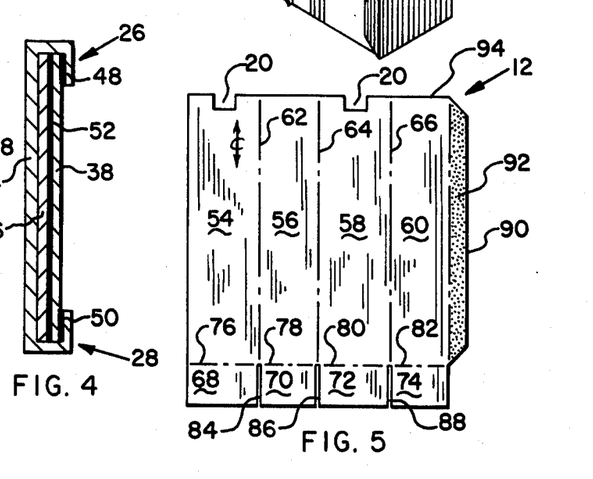
FIG. 4 is a sectional view taken along line 4—4 of FIG. 2.
FIG. 5 is a plan view of the production blank for one of the product receiving cells.

Referring now to FIG. 4 of the drawing there is shown a sectional view taken through line 4—4 of FIG. 2 showing the relationship of the inner liner 34, the intermediate liner 36 and the outer liner 38. As beforementioned, the inner liner 34 has formed on the top thereof a plurality of top flaps, shown generally by the numeral 26, and has formed on the bottom thereof a plurality of bottom flaps, shown generally by the numeral 28 which may be laminated to the outer liner 38 by means of the glue 48 and the glue 50 as shown by the heavy lines in FIG. 4 of the drawing or may be held in place by means of the straps 30 and 32 as shown in FIG. 2 of the drawing or may be held in place by other fastening means or a combination of fastening means known in the art. By laminating the flaps 26 and 28 to the outer liner 38, the three liners 34, 36 and 38 are rigidly held in juxtaposition to each other and form a tight, compact, load-bearing outer shell 18 for the combination shipping and storage container. In the preferred embodiment the outer liner 38 as well as the intermediate liner 36 would be formed from double wall construction while the inner liner 34 with its attached top flaps 26 and bottom flaps 28 would be formed of a single wall construction. In the preferred embodiment the outer liner 38 and the intermediate liner 36 are laminated together by means of the glue 52 while the inner liner 34 is not necessarily laminated to the intermediate liner 36 but may be so laminated within the spirit and scope of the invention.

When constructed thusly, the removable and reusable outer shell 18 represents the major portion of the cost of the combined shipping and storage container and provides the necessary resistance to bulge, damage and most important the stacking strength for multi-tier storage in a warehouse. This outer shell 18 may be easily removed from the inner container 11 or cells 12, 14 and 16 and may be reshipped to the customer for reuse by the customer with a new inner container or cells thereby minimizing the expense of providing an expensive outer shell 18 for each group or groups of cells that are utilized in the combination shipping and storage container.

Referring now to FIGS. 5–9 of the drawings there is shown in plan view the various production blanks of the requisite parts of the invention with FIG. 5 showing the production blank of one cell which may be utilized either singly or in combination with other similar cells to form the product receiving portion of the combined container. As shown in FIG. 5, the cell 12 may comprise a plurality of elongated panels 54, 56, 58 and 60 which are hingedly attached to each other by means of the scorelines 62, 64 and 66. The elongated panels also have formed on the bottom thereof a series of flaps 68, 70, 72 and 74 by means of the scorelines 76, 78, 80 and 82. The flaps 68–74 are separated from each other by means of a plurality of die cuts 84, 86, and 88 and form the bottom of the product receiving cell. These flaps may be laminated together, stapled together or may be held together by other well known fastening means in order to form a bottom that will contain the product to be held in the cell.

Formed along one edge of the panel 60 is an elongated flap 90 which is used to form a manufactured joint to overlap with the opposite flap 54 and is held in place thereon by means of the glue 92 which is placed along the flap 90. When formed thusly, the cell 12 may be made up into an elongated box having an open top and a closed bottom which will then be utilized to receive a plurality of products or bulk products which may be packaged within the cell. When three cells, similar to cell 12 shown in FIG. 5, are positioned together, they will form a plurality of cells making up the inner container 11 cellular product receiving portion of the combined container as taught in the preferred embodiment and as shown in FIG. 2 of the drawing.

As has been before described, the cell 12 and any other cells constructed similar to the cell 12, will have a plurality of notches 20 formed on the upper edge 94 of the production blank which will be opposite to each other whenever the production blank is formed into the cell shown in FIG. 2 of the drawing. These notches aid in removing the outer shell from the inner container whenever the outer shell is lifted upwardly as will be described more fully hereinafter when referring to FIG. 10 of the drawing.

Figure 6:
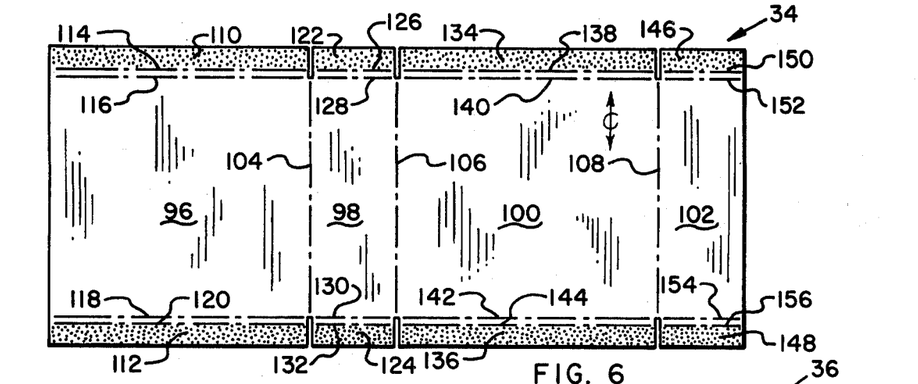
FIGS. 6-8 are plan views of the production blanks for the removable outer shell which comprises an inner liner shown in FIG. 6, an intermediate liner shown in FIG. 7 and an outer liner shown in FIG. 8.

Referring now to FIG. 6 of the drawing there is shown in more detail the production blank for the inner liner 34 which comprises a plurality of panels 96, 98, 100 and 102 which are hingedly attached to each other by means of the scorelines 104, 106 and 108. The panels 96, 98, 100 and 102 have formed on the top and bottom thereof the plurality of top flaps hereinbefore referred to generally as the top flaps 26 and the plurality of bottom flaps herein referred to generally as the bottom flaps 28. For example, the panel 96 has formed on the top thereof a top flap 110 and on the bottom thereof a bottom flap 112 by means of the scorelines 114, 116, 118 and 120. In a similar manner the panel 98 has formed on the top thereof a top flap 122 and on the bottom thereof a bottom flap 124 by means of the plurality of scorelines 126, 128, 130 and 132. In a like manner the panel 100 has formed on the top thereof a top flap 134 and on the bottom thereof a bottom flap 136 by means of the plurality of scorelines 138, 140, 142 and 144. And finally in a like manner, the panel 102 has formed on the top thereof a top flap 146 and on the bottom thereof a bottom flap 148 by means of the plurality of scorelines 150, 152, 154 and 156. The top flaps 110, 122, 134 and 146 as well as the bottom flaps 112, 124, 136 and 148 have glue applied thereto as shown by the stippled area on the respective flaps.

Figure 7:
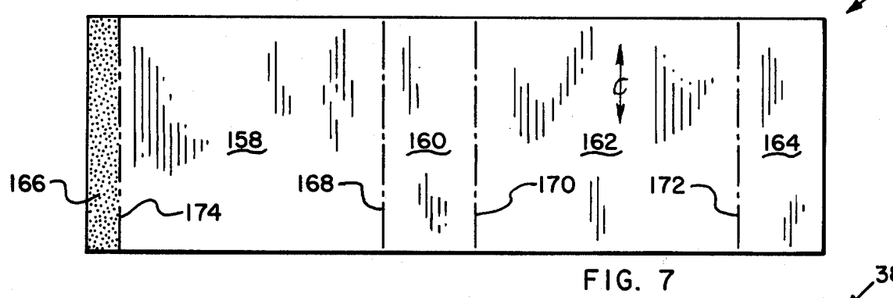

Referring now to FIG. 7 of the drawing there is shown the intermediate liner 36 which comprises a plurality of panels 166, 158, 160, 162, and 164 which are hingedly attached to each other by means of the plurality of scorelines 174, 168, 170 and 172. The panel 166 has a quantity of glue applied thereto as shown by the stippled area in the panel and is designed to form a manufactured joint when lapped over the panel 164 and glued thereto as is well known in the art.

Figure 8:
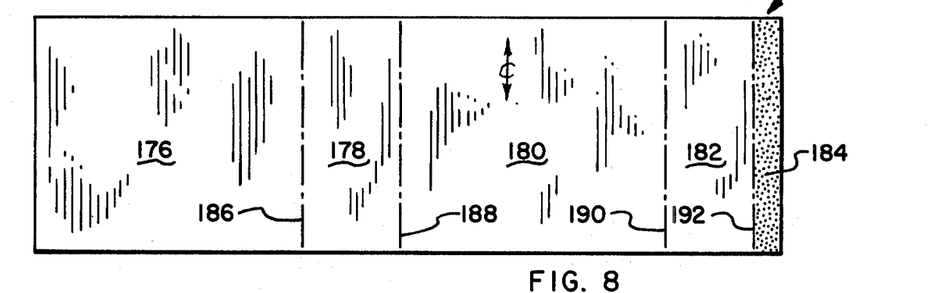

Referring now to FIG. 8 of the drawing there is shown in detail the outer liner 38 which comprises a plurality of panels 176, 178, 180, 182 and 184 which are hingedly attached to each other by means of the plurality of scorelines 186, 188, 190 and 192. The panel 184 has formed thereon glue, as shown by the stippled area in the panel, and is designed to form a manufactured joint when lapped over the panel 176 and being glued thereto as is well known in the art.

Figure 9:
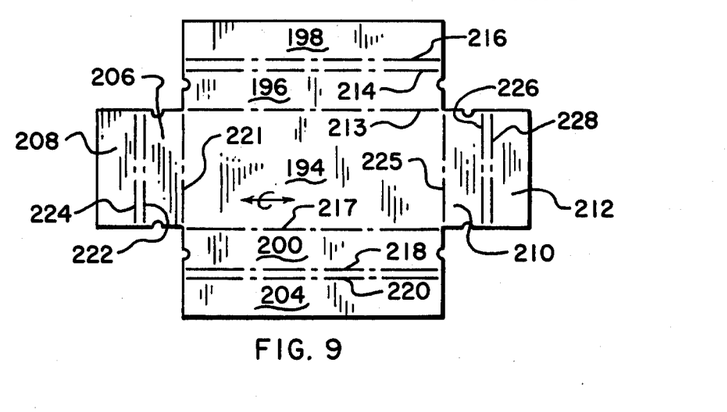
FIG. 9 is a plan view of a production blank of the top and/or bottom cap which may be utilized with the subject invention.

Referring now to FIG. 9 of the drawing there is shown in detail the production blank of the top cap 40 and the bottom cap 42 as shown in FIG. 3 of the drawing. The top and bottom caps are formed with a central panel 194 having attached thereto, on the opposite edges, panels 196, 198, 200, 204, 206, 208, 210 and 212. The panel 196 is hingedly attached to the panel 194 by means of the scoreline 213 and is hingedly attached to the panel 198 by means of the parallel scorelines 214 and 216. In a like manner the panel 200 is hingedly attached to the panel 194 by means of the scoreline 217 and is also hingedly attached to the panel 204 by means of the parallel scorelines 218 and 220. In a similar manner the panel 206 is hingedly attached to the panel 194 by means of the scoreline 221 and is also hingedly attached to the panel 208 by means of the parallel scorelines 222 and 224. And finally in a like manner, the panel 210 is hingedly attached to the panel 194 by means of the scoreline 225 and is also hingedly attached to the panel 212 by means of the parallel scorelines 226 and 228.

Figures 10, 11, 18:
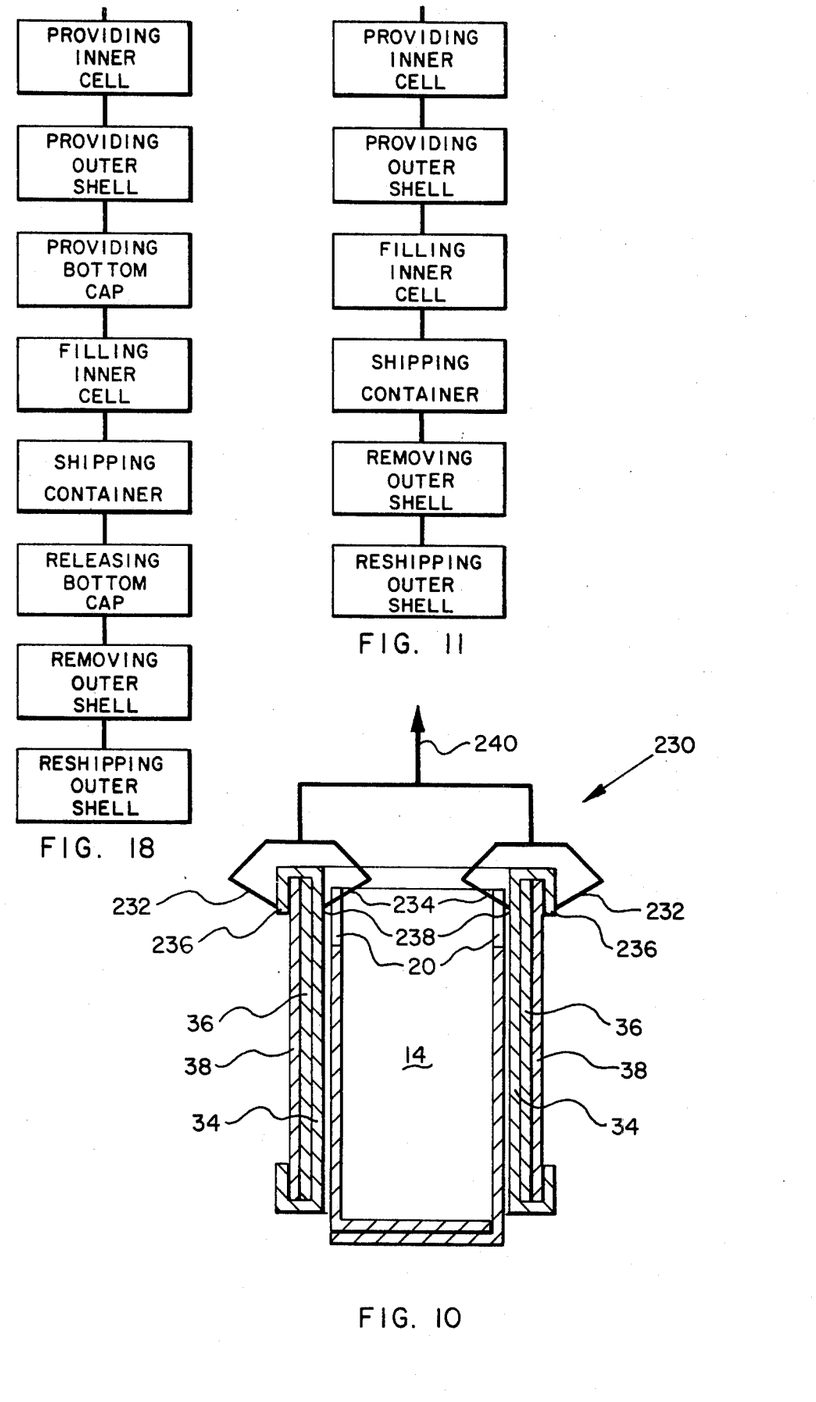
FIG. 10 is a sectional view taken along line 10—10 of FIG. 1 showing a cross section of the combination shipping and storage container and further showing how the notches formed in the upper portion of the inner container are utilized with a lifting device to lift the outer shell from the inner container.
FIG. 11 is a block diagram showing the method for packaging a product in the subject new and novel container.
FIG. 18 is a block diagram showing a modified form of the method for packaging a product.

Referring now to FIG. 10 of the drawing there is shown a sectional view taken along line 10—10 of FIG. 1 showing a cross section of the combination shipping and storage container of the subject invention and further showing how the notches 20 from the individual cells 12, 14 and/or 16 are utilized with a lifting device to lift the outer shell from the inner container. In FIG. 10 of the drawing, the lifting device, shown generally by the numeral 230 is shown in schematic form to illustrate how the outer shell may be lifted from the inner container utilizing the notches 20. The lifting device 230 would generally comprise a plurality of outer fingers 232 and a plurality of inner fingers 234 which are designed to be positioned upon the outer portion 236 of the outer shell as well as the inner portion 238 of the same outer shell and within the notches 20. After the fingers are thusly positioned, a force may be applied by the outer fingers 232 and the inner fingers 234 to squeeze the upper portion of the outer shell sufficiently to be able to lift the outer shell upwardly as the lifting device 230 is lifted upwardly in the direction shown by the arrow 240. From FIG. 10 it can be seen that by the use of the notches 20 formed on the upper portion of the cells, the inner fingers 234 are able to be positioned on the outer shell without touching the cell 12, 14 and/or 16. When utilized in this manner, the inner cells 12, 14 and 16 are left intact with their plurality of product contained in the cell while the outer shell may be quickly lifted from the cell or cells and may be re-shipped to the original purchaser of the shell. When the combination shipping and storage container is formed with one cell, then the lifting device 230 would utilize a pair of inner and outer fingers 232 and 234 on each side of the shell. And in a similar manner when the combination shipping and storage container would comprise two cells, then the lifting device 230 would utilize two pairs of lifting fingers 232 and 234 on each side of the shell. When the combination shipping and storage container contains three cells, as is shown in FIG. 2 of the drawing, then the lifting device 230 would comprise a plurality of three pairs of lifting fingers 232 and 234 on each side of the shell in order to lift the entire outer shell from the cells.

Referring now to FIG. 11 of the drawing there is shown a block diagram showing the new and novel method for packaging a product in the subject new and novel container which comprises the steps of providing an inner container having at least one product receiving cell for the container. The next step in the method is to provide at least one removable outer shell for the container which is designed to fit over and to surround the cell and to add stability to the cell whenever a plurality of product is packaged in the cell. Thereafter the cell is filled with the product at an original location and the entire container comprising the filled cell and the surrounding outer shell is shipped to the desired remote location dictated by the purchaser of the product contained within the cell. If desired the top cap 40 and bottom cap 42 may be positioned over the edges of the outer shell prior to shipment.

Upon receipt at the remote location the outer shell is removed from the cell by a method similar to that shown in FIG. 10 of the drawing or by other methods and the outer shell is then reshipped to its original location to be reused while allowing the cell and the product to remain at the remote location for storage and use purposes or as desired by the purchaser.

Figure 12:
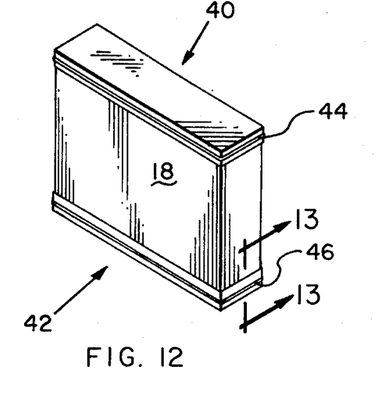
FIG. 12 is a perspective view of the subject container showing a top and bottom cap attached thereto.

Referring now to FIGS. 12-15 there is shown in greater detail how the top cap 40 and the bottom cap 42 may be positioned on the subject container and how these caps may be tightly secured to the container by various embodiments. FIG. 12 is a perspective view of the subject container showing a top cap 40 applied to the upper portion of the container and a bottom cap 42 applied to the lower portion of the container. The top and bottom caps are tightly secured to the container by means of the straps 44 and 46 which will be detailed more fully in FIGS. 13-15.

Figure 13:
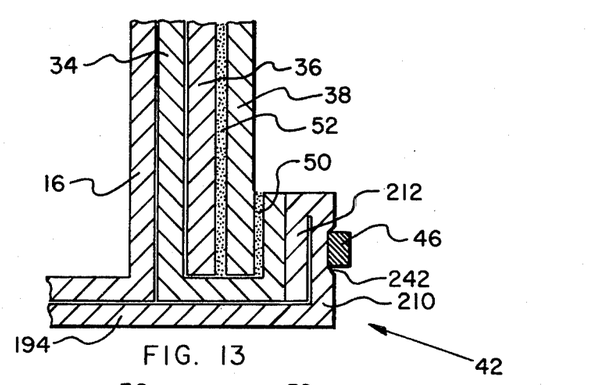
FIG. 13 is a partial enlarged sectional view, taken along line 13—13 of FIG. 12, showing the bottom cap attached to the shell.

Referring now to FIG. 13 of the drawing there is shown an enlarged partial sectional view of the bottom cap taken along line 13—13 of FIG. 12 and it should be noted that the top cap will be tightly secured to the upper portion of the container in the same manner as will now be described in relation to the bottom cap. After the outer shell 18, comprising an outer liner 38, an intermediate liner 36 and an inner liner 34, has been positioned over the inner container or cells shown in FIG. 13 by the numeral 16, a bottom cap 42 is applied to the combination after the bottom cap has been erected with its flaps 212 and 210 in juxtaposition along with the remaining flaps in the blank shown in FIG. 9. Thereafter, a strap 46 is applied around the bottom cap as shown in FIGS. 12 and 13 with the strap being pulled very tightly around the container causing an indentation 242 in the paper or other material forming the bottom cap. The strap 46 may be a steel strap or may be fabricated of some other material such as a plastic or other known materials utilized in the strapping art. When strapped thusly it can be seen that the bottom cap is tightly secured to the container which adds rigidity to the container structure. Whenever it is desired to remove the outer shell 18 from the cell 16, it is then necessary to release the strap 46 by cutting it thereby allowing the outer shell 18 to be removed upwardly as has been hereinbefore described.

Figure 14:
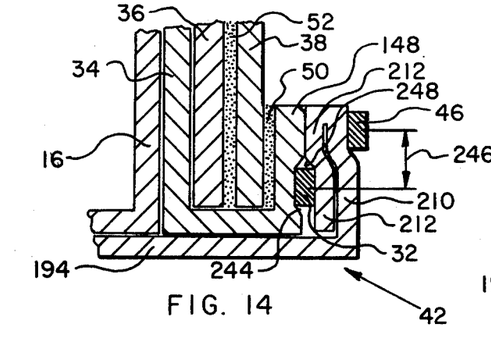
FIGS. 14-15 are partial enlarged sectional views similar to FIG. 13 showing modified forms of attaching the bottom cap to the outer shell.

Referring now to FIG. 14 of the drawing there is shown an enlarged partial sectional view of the same section shown in FIG. 13 of the drawing which would also represent a section taken through the top of the container whenever a top cap 40 is applied to the container. In this embodiment the outer shell 18 has applied thereto a banding strap 32 as has been hereinbefore described and as is shown in FIG. 2 of the drawing which is banded tightly around the lower portion of the outer shell causing an indentation shown at 244. In a similar manner the bottom cap has positioned thereupon in a manner similar to that shown in FIG. 13, a banding strap 46 which is in close proximity to the banding strap 32. It should be noted that the banding strap 46, however, is offset an amount, shown by the arrow 246, sufficient to distort a portion of the cap so that the cap locks tightly on the banding strap 32. That is to say, the flap 212 is bent inwardly into juxtaposition with the flap 148 so that the surface 248 is in contact with the banding strap 32 to tightly lock the cap on the outer shell at the banding strap. When constructed in this version, before the outer shell 18 can be lifted off the inner container, the banding strap 46 must be released by cutting and the flaps 212 and 210 of the bottom cap as well as other similar flaps of the bottom cap must be peeled back or moved out of the way in order for the outer shell 18 with its banding strap 32 attached to be lifted upwardly off the inner container.

Figure 15:
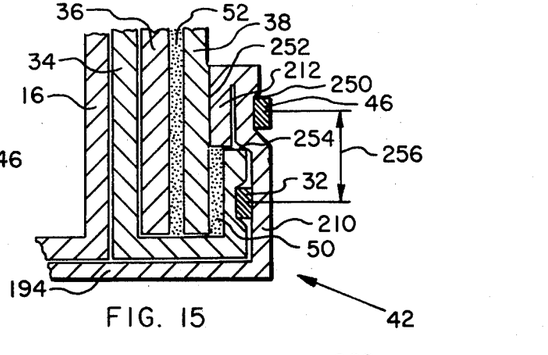

Referring now to FIG. 15 of the drawing there is shown another modification of the bottom and top cap locking feature wherein the caps are formed with a somewhat different configuration utilizing a longer flap 210 as well as a shorter flap 212 as shown in FIG. 15 and with both the outer shell and the cap having banding straps applied thereto. The banding strap for the outer shell is shown as the numeral 32 while the banding strap for the bottom cap is shown as the numeral 46. In this embodiment it can be seen that whenever the banding strap 46 is tightly positioned around the bottom cap, an indentation 250 is formed in the paperboard material and the flap 212 is distorted sufficiently so that a portion of the cap abuts the shell at 252 causing the cap to also abut with the flap of the outer shell at the surface 254. When formed in this manner the offset, shown by the numeral 256 is somewhat larger than the offset 246 shown in FIG. 14 of the drawing but is sufficient to distort the cap to lock it to the shell.

Figure 16:
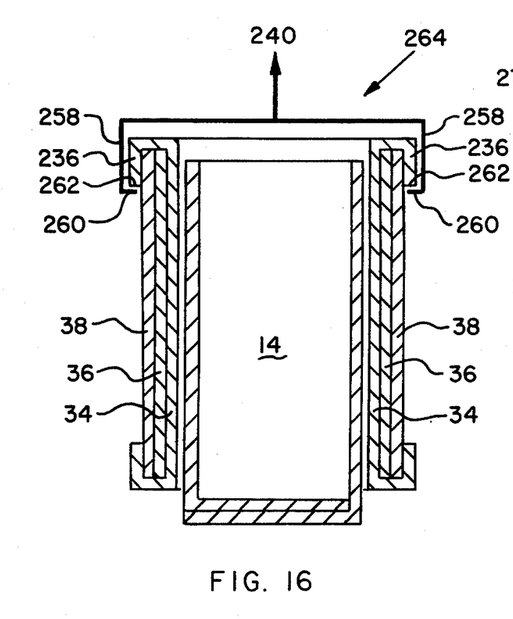
FIGS. 16-17 are sectional views similar to FIG. 10 showing modified forms of lifting the shell from the container.
Figure 17:
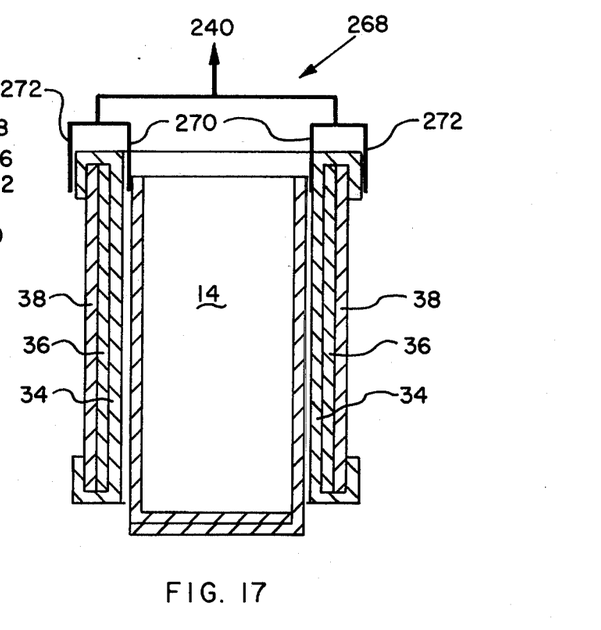

Referring now to FIGS. 16 and 17 of the drawings there are shown modifications of the basic container wherein the notches 20 have been eliminated from the cells 12, 14 and 16 and the lifting of the outer shell from the inner container is accomplished by other removing means. In the embodiment shown in FIG. 16 a lifting device, shown generally by the numeral 264, of a somewhat different configuration than the lifting device 230 shown in FIG. 10, is provided having a plurality of arms 258 attached to a plurality of inwardly facing fingers 260. The fingers 260 are designed to engage the surface 262 of the flap 236 and to lift the outer shell from the inner container whenever the lifting device is raised in the direction shown by the arrow numeral 240. In this embodiment the notches 20 have been eliminated and the surface 262 serves in part as the removing means for removing the outer shell from the inner container.

Referring to FIG. 17 of the drawing there is shown another modification of the lifting device wherein a somewhat different lifting device, shown generally by the numeral 268, is provided which has a pair of inner fingers 270 and a pair of outer fingers 272. The inner fingers 270 and the outer fingers 272 are designed so that they can be squeezed together and are designed so that they fit over the top of the outer shell as shown in FIG. 17 of the drawing with the inner fingers 270 being positioned between the outer shell and the inner container. When positioned in this manner and squeezed together, it can be seen that whenever the lifting device 268 is raised upwardly in the direction shown by the arrow numeral 240, the outer shell may be removed from the inner container. The fingers 270 and 272 form a clamp which is designed to clamp over the upper portion of the outer shell.

Referring now to FIG. 18 of the drawing there is shown a modification of the method hereinbefore taught whenever a bottom cap 42 is applied to the outer shell as has been hereinbefore described and as is shown in FIGS. 13-15. When utilizing a bottom cap on the container, the basic method would then comprise providing an inner container having at least one product receiving inner cell for the container and providing at least one removable outer shell for the container which is designed to fit over and to surround said inner container to add stability thereto. Thereafter a bottom cap is provided and secured to the outer shell in a manner utilizing one of the embodiments shown in FIGS. 13-15 or other embodiments. Thereafter the container is filled with a product at an original location and is shipped with the product in the container to a remote location whereupon the bottom cap is released from the outer shell by cutting the banding strap as has been hereinbefore described. Thereafter the outer shell may be removed from the inner container and may be reshipped back to its original location or to some other location to be reused while allowing the inner container and the product to remain at the remote location for storage and use purposes. Whenever it is desired to provide the container with a top cap in addition to the bottom cap, then the top cap is provided and secured to the outer shell after the inner container is filled.

In the preferred embodiment, the inner cells, the outer shell and the top and bottom caps, if utilized, are formed generally of corrugated paper materials known in the art but may be formed of other materials within the spirit and scope of the invention. When formed of corrugated paperboard, the direction of the flutes or the corrugation is shown generally by the arrows marked C. That is, the flute direction for the inner container or cells is shown on panel 54 while the direction of the flutes for the outer shell is shown respectively on panels 100, 162 and 180 while the direction of the flutes on the top and bottom caps is shown in panel 194.

From the foregoing it can be seen that there has been provided by the subject invention a new and novel combination shipping and storage container and method of packaging a product in the container which accomplishes all of the objects and advantages of the invention. From a reading of the foregoing specification and a study of the attached drawings, it is apparent that many changes may be made in the details of construction and arrangement of the parts and steps of the method without departing from the spirit and scope of the invention as expressed in the accompanying claims and the invention is not to be limited to the exact manner shown and described as the preferred embodiments have been given by way of illustration only.

Having described our invention, we claim:

1. A method of packaging and shipping a bulk material product in a combination container comprising the steps of:
   a. providing an inner paperboard container having at least one product receiving cell for the combination container;
   b. providing at least one removable outer paperboard shell for the combination container designed with an open bottom to be fit over and to surround said inner container to add stability thereto;
   c. filling said product receiving cell with a bulk material product at an original location, said inner container and said outer shell being constructed so that any frictional holding forces between the walls thereof are less than the combined weight of said inner container and the products in said product receiving cell;
   d. shipping said inner container with said product and with said outer shell fit over and surrounding the same to a remote location;
   e. lifting said outer shell upward from said inner container and the product to remove the outer shell;
   f. reshipping the removed outer shell back to its original location while allowing said inner container and the product to remain at the remote location for storage and use purposes; and g. fitting said outer shell over another inner container having at least one product receiving cell.

2. The method as defined in claim 1 further comprising the step of positioning a bottom cap on the outer shell before filling the product receiving cell.

3. The method as defined in claim 2 further comprising the step of positioning a top cap on the outer shell after filling the product receiving cell.

4. A method of packaging and shipping a bulk material product in a combination container comprising the steps of:
   a. providing an inner paperboard container with at least one product receiving cell for the combination container and with notches in opposite sides of the upper portion of the inner container;
   b. providing at least one removable outer paperboard shell for the combination container designed to be fit over and to surround said inner container to add stability thereto;
   c. filling said inner container with a bulk material product at an original location, said inner container and said outer shell being constructed so that any frictional holding forces between the walls thereof are less than the combined weight of said inner container and the product in said product receiving cell;
   d. shipping said inner container with said product and with said outer shell thereon to a remote location;
   e. gripping said outer shell through said notches in said inner container,
   f. lifting said outer shell upward while gripped to remove said outer shell from said inner container and product;
   g. reshipping the removed outer shell back to its original location while allowing said inner container and the product to remain at the remote location for storage and use purposes; and
   h. fitting said outer shell over another inner container having at least one product receiving cell.

5. The method as defined in claim 4 further comprising the steps of providing and securing a top cap on the outer shell after filling the inner container.

6. The method as claimed in claim 4 wherein the gripping is performed by inner and outer fingers of a lifting device engaging both the inner and outer surfaces of the outer shell.

* * * * *

UNITED STATES PATENT OFFICE
CERTIFICATE OF CORRECTION

Patent No. 4,056,913     Dated  Nov. 8, 1977

Inventor(s) Robert A. Bamburg, Farris N. Duncan, Roger M. Floyd

It is certified that error appears in the above-identified patent and that said Letters Patent are hereby corrected as shown below:

Abstract - Line 16 - Following the word "location." -- begin a new paragraph.
Column 1, line 53, following the word "inner" insert -- container has --.
Column 2, line 41, delete "outer" and insert in place thereof -- inner --.
Column 4, line 18, preceding the word "container" insert the word -- inner --.
Column 6, line 35, following the numeral "11" insert -- which is the --.

Column 8, line 1, delete "inner".
Column 10, line 53, delete "cells" and insert in place thereof -- container --.

Signed and Sealed this

Eleventh Day of April 1978

[SEAL]

Attest:

RUTH C. MASON
Attesting Officer

LUTRELLE F. PARKER
Acting Commissioner of Patents and Trademarks